(12) United States Patent
Khosla

(10) Patent No.: US 7,026,979 B2
(45) Date of Patent: Apr. 11, 2006

(54) METHOD AND APPARATUS FOR JOINT KINEMATIC AND FEATURE TRACKING USING PROBABILISTIC ARGUMENTATION

(75) Inventor: Deepak Khosla, Calabasas, CA (US)

(73) Assignee: HRL Labortories, LLC, Malibu, CA (US)

( * ) Notice: Subject to any disclaimer, the term of this patent is extended or adjusted under 35 U.S.C. 154(b) by 93 days.

(21) Appl. No.: 10/742,738

(22) Filed: Dec. 19, 2003

(65) Prior Publication Data

US 2005/0001759 A1    Jan. 6, 2005

Related U.S. Application Data

(60) Provisional application No. 60/484,637, filed on Jul. 3, 2003.

(51) Int. Cl.
   *G01S 13/72* (2006.01)
(52) U.S. Cl. .............................. 342/90; 342/95; 342/97; 342/140; 342/195
(58) Field of Classification Search .................. 342/90, 342/95–97, 107, 108, 140, 159, 162, 195; 702/189, 190
See application file for complete search history.

(56) References Cited

U.S. PATENT DOCUMENTS

| | | | | |
|---|---|---|---|---|
| 5,315,538 | A | * | 5/1994 | Borrell et al. ............... 702/189 |
| 5,414,643 | A | * | 5/1995 | Blackman et al. ............ 342/95 |
| 5,469,374 | A | * | 11/1995 | Graham et al. ............. 342/159 |
| 5,471,434 | A | * | 11/1995 | Davis et al. ................. 367/124 |
| 5,737,249 | A | * | 4/1998 | Chang et al. ................ 702/190 |
| 2005/0001759 | A1 | * | 1/2005 | Khosla ......................... 342/90 |

OTHER PUBLICATIONS

"A comparison of several different approaches for target tracking with clutter", Pao, L.Y.; Powers, R.M. American Control Conference, 2003. Proceedings of the 2003vol. 5, Jun. 4-6, 2003 Ps: 3919-3924.*

"Multiple model PMHT and its application to the benchmark radar tracking problem", Ruan, Y.; Willett, P. Aerospace and Electronic Systems, IEEE Transactions on vol. 40, Issue 4, Oct. 2004 Ps: 1337-1350.*

(Continued)

*Primary Examiner*—John B. Sotomayor
(74) *Attorney, Agent, or Firm*—Tope-McKay & Associates

(57) ABSTRACT

A method, apparatus, and computer program product for joint kinematic and feature tracking are presented. Kinematic measurements and feature/class measurements regarding an object are received from a sensor. A probabilistic argumentation operation is performed on the feature/class measurements using information from a knowledge base and a track file ect to generate feature track likelihood scores regarding likely tracks for the object. Kinematic track likelihood scores are generated based on the kinematic measurements and the track file. Joint track likelihood scores are generated based on the feature track likelihood scores and the kinematic track likelihood scores. Joint track likelihood scores are used to generate a multi-frame track measurement association to determine a most likely track for the object. The track file is continually updated with the most likely track for the object, so that the most likely trajectory of the object is obtained.

48 Claims, 5 Drawing Sheets

OTHER PUBLICATIONS

"A real-time multitarget system with robust multichannel CNN-UM algorithms", Timar, G.; Rekeczky, C. Circuits and Systems I: Regular Papers, IEEE Transactions on Circuits and Systems I: vol. 52, Issue 7, Jul. 2005 Ps: 1358-1371.*

"Joint kinematic and feature tracking using probabilistic argumentation", Khosla-D; Chen-Y. Sixth International Conference on Information Fusion, Cairns, Qld., Australia, Jul. 8-11, 2003. In: p. 688-93.*

R.W. Sittler, "An Optimal Data Association Problem in Surveillance Theory," IEEE Trans. On Military Electr., vol. MIL-8, Apr. 1964, pp. 125-139.

E. Bosse and J. Roy, "Fusion of Identity Declarations from Dissimilar Sources using Dempster-Shafer Theory," Optical Eng., vol. 36, No. 3, Mar. 1997, pp. 648-657.

E. Blasch and L. Hong, "Data association through fusion of target track and Identification Sets," 3rd Int'l Conf. on Data Fusion, Fusion 2000, Jul. 2000.

K.J. Sullivan, et al., "Signature-aided tracking using HRR profiles," Proc. SPIE Conf. on algorithms for synthetic aperture Radar Imagery VIII, vol. 4382, pp. 132-142, 2001.

J. Kohlas and R. Haenni, "Assumption-Based Reasoning and Probabilistic Argumentation Systems," Tech. rep. 96-07, Inst. of Informatics, Univ. of Fribourg, 1996.

B. Anrig, et al., "Probabilistic Argumentation Systems: Introduction to Assumption-Based Modeling with ABEL," Inst. of Informatics, Univ. of Fribourg, 1998.

S. Blackman and R. Popoli, "Design and Analysis of Modern Tracking Systems," Artech House, 1999, pp. 1069-1111.

* cited by examiner

| PERFORMANCE METRIC | WITHOUT FEATURES | WITH FEATURES |
|---|---|---|
| Track misassociations | 23% | 2% |
| Track RMS position error | 140 meters | 62 meters |
| Non-declared track ID | 14% | 0.6% |
| False track ID | 4% | 0% |

FIG. 5

METHOD AND APPARATUS FOR JOINT KINEMATIC AND FEATURE TRACKING USING PROBABILISTIC ARGUMENTATION

PRIORITY CLAIM

The present invention claims the benefit of priority to provisional application No. 60/484,637, filed at the United States Patent Office on Jul. 3, 2003 and titled "Method and Apparatus for Joint Kinematic and Feature Tracking Using Probabilistic Argumentation."

BACKGROUND (1) Technical Field

The present invention relates to techniques for fusing sensor data for object tracking. More specifically, the present invention relates to a method, apparatus and computer program product that uses both kinematic and feature-based tracking using probabilistic argumentation.

(2) Discussion

Multiple Target Tracking (MTT) is an essential requirement for surveillance, tracking, and control systems that employ one or more sensors to interpret an environment that includes both true objects and false alarms. The goal of tracking is to robustly provide accurate and timely information regarding the number of objects and their state and type. This is important in both military and commercial applications. A typical military application is automated target tracking and identification of ground and aerial targets. An example of a commercial application is in automotive forward collision warning system, which requires both kinematic and type (roadside/vehicle/pedestrian) information on in-path obstacles for effective system performance. Another commercial application is automatic tracking of aircraft in an air show, and identification of ground and aerial targets. The central problem of multiple target tracking is that of associating sensor measurements with existing or new tracks. This data association process is uncertain due to many factors, non-limiting examples of which include inaccurate measurements, partially obscured targets, closely-spaced target configurations, poor signal-to-noise ratio, random false alarms in the detection process, clutter near the target of interests, interfering targets, and decoys or other countermeasures.

The current state-of-the-art in MTT is a Kalman filter-based multiple hypothesis tracker (MHT) that uses kinematic (position, velocity, etc.) information to carry out the association process. A multiple hypothesis tracking (MHT) data association method with interacting multiple model (IMM) filtering is described in the publication "Design and Analysis of Modem Tracking Systems," cited herein, and has been applied to several real-world applications. This tracker uses kinematic (or metric) quantities and certain signal-related quantities for data association. No use is made of features in data association. Both the memory and computation requirements of MHT increase exponentially with problem size. In most applications, the target identification or class information is obtained by using feature measurements outside of a kinematic data association module. While this approach works well for relatively benign environments, it performs poorly in difficult environments. For example, it defaults to group tracking in dense track environments, or loses track during complex movements or over long periods of time.

The need for accurate and timely information on the kinematic state and features of an object is important for both military and commercial applications. In most cases, the kinematic information (position/velocity/acceleration) and features (class/identification (ID)/type) are obtained using sequential processing (where one type of information aids the estimation of the other) or through completely uncoupled and independent processing. This could result in poor track and feature estimation, lost tracks, misidentified objects, slow system response, etc. The present invention will overcome these limitations. It will increase the robustness of the data association operation, which is the most difficult and error-prone operation in multi-target tracking. As a result of robust data association, the target identity estimation will be more accurate.

Previous methods that combine features and kinematic information suffer from the limitation that they use Bayesian methods, and thus require complete knowledge of prior probabilities and a full probability description of features for all target classes, which are often unavailable. The technique of the present invention will overcome this limitation. Since domain knowledge about target classes and their features is often most naturally expressed in the form of logical statements or rules, the technique of the present invention would be more suitable, allowing the knowledge base to be logic rules and permitting a much more general expression of ignorance and uncertainty. As a result, systems of the present invention would be much more flexible and applicable to a large domain of problem areas and applications than are those of the prior art.

Major improvements to the state-of-the-art are needed, but can only be achieved by a paradigm shift in approaches to the MTT problem. The present invention, by using a combination of joint kinematic and feature tracking including probabilistic argumentation, helps to overcome the aforementioned limitations.

For information regarding the previous systems and methods, as well as background information, the reader is directed to the following references.

[1] S. Blackman and R. Popoli, *Design and Analysis of Modem Tracking Systems*, Artech House, 1999.

[2] R. W. Sittler, "An Optimal Data Association Problem in Surveillance Theory," *IEEE Trans. On Military Electronics*, Vol. MIL-8, April 1964, pp. 125–139.

[3] E. Bosse and J. Roy, "Fusion of Identity Declarations from Dissimilar Sources using Dempster-Shafer Theory", *Optical Eng.*, Vol. 36, No. 3, March 1997, pp. 648–657.

[4] E. Blasch and L. Hong, "Data association through fusion of target track and Identification Sets, $3^{rd}$ *International Conference on Data Fusion*, Fusion 2000, July 2000.

[5] K. J. Sullivan, M. B. Ressler, R. L. Williams, "Signature-aided tracking using HRR profiles", *Proc. SPIE Conf. on algorithms for synthetic aperture Radar Imagery VIII*, vol. 4382, p. 132–142, 2001.

[6] J. Kohlas and R. Haenni, "Assumption-Based Reasoning and Probabilistic Argumentation Systems", Tech, report 96-07. Institute of Informatics, University of Fribourg. 1996.

[7] B. Anrig, R. Bissig, R. Haenni, J. Kohlas, and N. Lehmann, "Probabilistic Argumentation Systems: Introduction to Assumption-Based Modeling with ABEL", Institute of Informatics, University of Fribourg. 1998.

[8] J. Pearl, Probabilistic Reasoning in Intelligent Systems: Network of Plausible Inference, Morgan Kaufmann, 1988.

[9] S. Blackman, Multiple-Target tracking with Radar Applications, Artech House, 1986.

SUMMARY

The present invention teaches a method, apparatus, and computer program product for performing joint kinematic and feature tracking. In one aspect, the present invention performs an operation of receiving kinematic measurements and feature/class measurements regarding an object from a sensor. In another aspect, the invention performs an operation of performing a probabilistic argumentation operation on the feature/class measurements using information from a rule-based knowledge base and a track file regarding the object to generate feature track likelihood scores that provide information regarding likely tracks for the object. In still another aspect, the invention performs an operation of generating kinematic track likelihood scores based on the kinematic measurements and the track file regarding the object. In yet another aspect, an operation of generating joint track likelihood scores based on the feature track likelihood scores and the kinematic track likelihood scores is performed. Further, the invention performs an operation of using the joint track likelihood scores to generate a multi-frame track measurement association to determine a most likely track for the object. Finally, the invention performs an operation of updating the track file with the most likely track for the object; whereby the method tracks an object and continually updates the track file for the object, so that the most likely trajectory of the object is obtained.

In another aspect of the present invention, the kinematic track likelihood scores are generated using a technique selected from a group consisting of a global nearest neighbor technique, multiple hypothesis tracking technique, and a log-likelihood technique.

In still another aspect, the present invention further comprises an operation of normalizing the feature track likelihood scores and the kinematic track likelihood scores to allow for accurate computation of the joint track likelihood scores.

In yet another aspect, the operation of normalizing uses a degree of contradiction, k, in a Probabilistic Argumentation System used to perform the probabilistic argumentation operation as a part of an operation of performing a normalizing calculation.

In a yet further aspect, the kinematic measurements are received radar signals.

In a still further aspect, the feature/class measurements are received radar signals.

In another aspect, in the operation of performing a probabilistic argumentation operation, class probabilities are generated for the feature/class measurements and are used, along with the kinematic track likelihood scores in the determination of a most likely track for an object.

In a further aspect, the operations of generating kinematic track likelihood scores and generating joint track likelihood scores are performed substantially simultaneously, so that kinematic and class information regarding a target may be simultaneously updated.

In another aspect, the invention further comprises an operation of outputting a representation of the most likely trajectory of an object for a user.

The above-mentioned operations may be performed as acts of a method, as computer-executable instructions operating on a computer system in an apparatus, and as computer-executable instructions residing in/encoded on a computer readable medium in a computer program product. The operations presented may be combined in a wide variety of arrangements and may also be used along with other operations or elements to provide a range of specific aspects without departing from the scope of the invention presented herein.

BRIEF DESCRIPTION OF THE DRAWINGS

The objects, features, and advantages of the present invention will be apparent from the following detailed descriptions of the various aspects of the invention in conjunction with reference to the following drawings, where:

FIG. 4 is a plot diagram depicting the tracking of three maneuvering aircraft in an air show, where: FIG. 5 is a table containing performance values for an example of the present invention, highlighting the difference between performance without the use of feature data and performance with the use of feature data.

DETAILED DESCRIPTION

Figure 1:
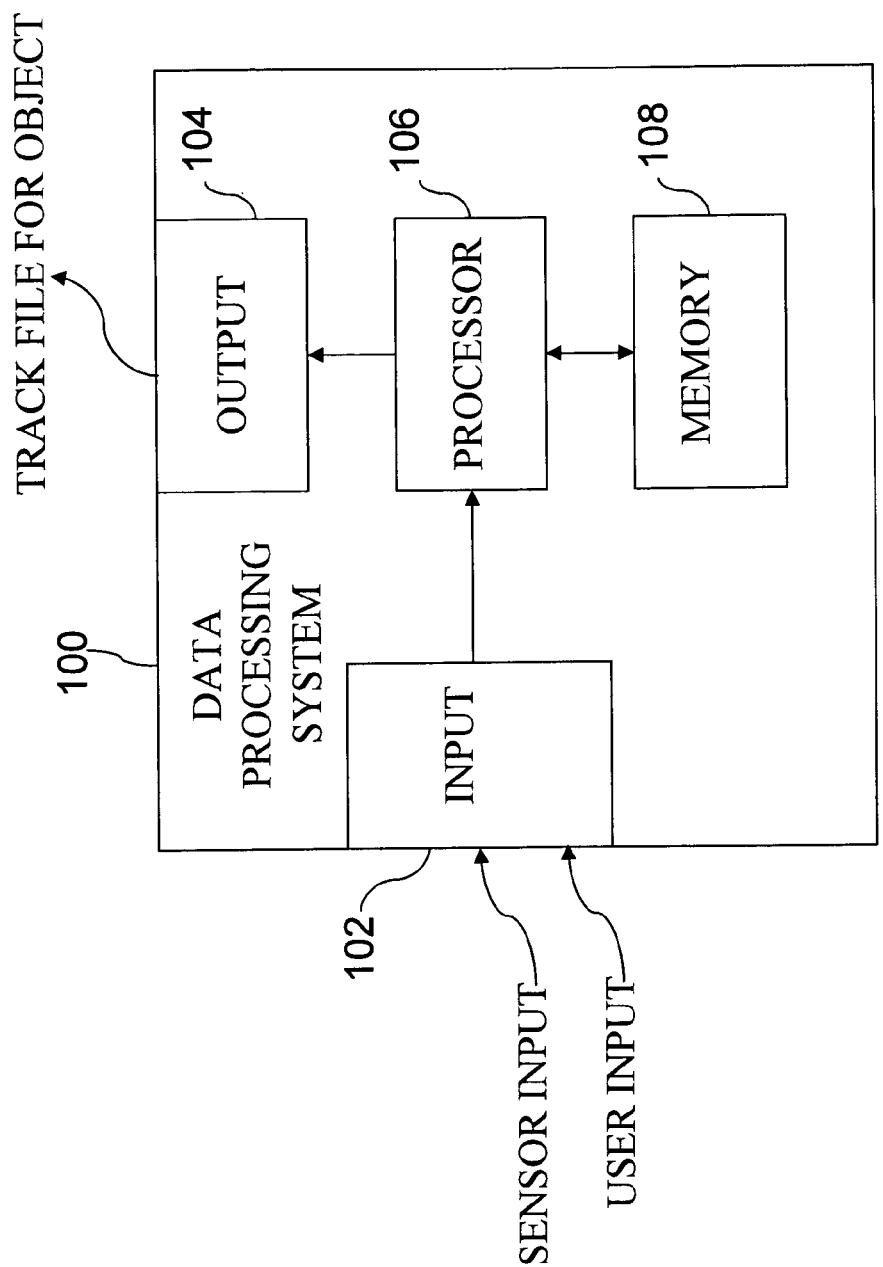
FIG. 1 is a block diagram of a data processing system used in conjunction with the present invention.

The present invention relates to techniques for fusing sensor data for object tracking. More specifically, the present invention relates to a system that uses both kinematic and feature-based tracking using probabilistic argumentation. The following description, taken in conjunction with the referenced drawings, is presented to enable one of ordinary skill in the art to make and use the invention and to incorporate it in the context of particular applications. Various modifications, as well as a variety of uses in different applications, will be readily apparent to those skilled in the art, and the general principles defined herein, may be applied to a wide range of aspects. Thus, the present invention is not intended to be limited to the aspects presented, but is to be accorded the widest scope consistent with the principles and novel features disclosed herein. Furthermore it should be noted that unless explicitly stated otherwise, the figures included herein are illustrated diagrammatically and without any specific scale, as they are provided as qualitative illustrations of the concept of the present invention.

Below, a brief glossary of terms is presented for the reader. These definitions are not intended to convey the full scope of the terms in respect to the invention, but are provided to give the reader a general understanding of the terms and to serve as a central location to which the reader can refer.

Feature/Class Measurement—A feature/class measurement is a measurement directly about the class/type of a target or an indirect measurement about the class/type in the form of features. A class is information directly about the object to be identified (e.g., whether the object is a truck or a tank). A feature, generally speaking, is a frequency of a signal from an object (representing a characteristic or attribute). The latter generally assumes that some relationship between the features and the class (type) are available in the form of uncertain rules.

Kinematic Measurement—A kinematic measurement is a measurement regarding some kinematic characteristic of a target, such as position and/or velocity. Kinematic measurements are typically generated through the use of a sensor such as a radar generating radar signals.

Means—The term "means" as used with respect to this invention generally indicates a set of operations to be performed on a computer, and may represent pieces of a whole program or individual, separable, software modules. Non-limiting examples of "means" include computer program code (source or object code) and "hard-coded" electronics (i.e. computer operations coded into a computer chip). The "means" may be stored in the memory of a computer or on a computer readable medium.

Rule-Based Knowledge—Examples of rule-based knowledge include rules presented in predicate logic or multi-valued logic form. Rules in these forms are available for many applications. As an advantage, knowledge in rule form can be relatively easy to solicit and maintain. Further, theory in combining logic and probability has emerged in the form of the Probabilistic Argumentation System (PAS). Rules are used to describe relationships between features of an object that are measured by a sensor and the class or type of the object.

Sensor—A sensor is used to measure characteristics of a target, including both kinematic measurements and feature/class measurements. Depending on the sensor used, it may also directly provide target class or feature type information.

Track—A track is a time-sequence of kinematic measurements (position/velocity) and class/type (probability) estimates for an object (target).

Next, a discussion of various principal aspects of the present invention is provided. Finally, a discussion is provided to give an understanding of the specific details.

(1) Principal Aspects

The present invention has several "principal" aspects, three of which are emphasized in this section. The first is a system for joint kinematic and feature tracking using probabilistic argumentation, typically in the form of a computer system operating software or in the form of a "hard-coded" instruction set. This system may be incorporated into various devices and may be coupled with a variety of sensors to provide for object tracking. The second principal aspect is a method, typically in the form of software, operated using a data processing system (computer). The third principal aspect is a computer program product. The computer program product generally represents computer readable code stored on a computer readable medium such as an optical storage device, e.g., a compact disc (CD) or digital versatile disc (DVD), or a magnetic storage device e.g., a floppy disk or magnetic tape. Other, non-limiting examples of computer readable media include hard disks, read only memory (ROM), and flash-type memories. These aspects will be described in more detail below and in the remainder of the specification.

A block diagram depicting the components of a computer system that may be used in conjunction with the present invention is provided in FIG. 1. The data processing system 100 comprises an input 102 for receiving information from at least one sensor for use in tracking objects. The information is typically received in the form of kinematic measurements and/or feature/class measurements. Note that the input 102 may include multiple "ports." The output 104 is connected with a processor 106 for providing information regarding the object(s) to other systems in order to augment their actions to take into account the position and motion of the object(s) being tracked. Output may also be provided to other devices or other programs, e.g. to other software modules for use therein or to display devices for display thereon. The input 102 and the output 104 are both coupled with the processor 106, which may be a general-purpose computer processor or a specialized processor designed specifically for use with the present invention. The processor 106 is coupled with a memory 108 to permit storage of data and software to be manipulated by commands to the processor.

Figure 2:
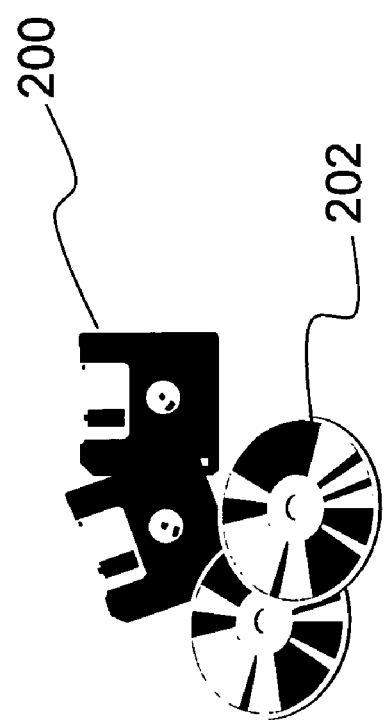
FIG. 2 is an illustrative diagram of a computer program product aspect of the present invention.

An illustrative diagram of a computer program product embodying the present invention is depicted in FIG. 2. The computer program product is depicted as a magnetic disk 200 or an optical disk 202 such as a CD or DVD. However, as mentioned previously, the computer program product generally represents computer readable code stored on any desirable computer readable medium.

(2) Description of the Invention (A) Introduction

The present invention provides a method, apparatus, and computer program product that uses a feature-aided tracking approach that incorporates a traditional Kalman recursive filter within an evidential reasoning framework. In deciding whether to associate measurement data with new or existing tracks, the method uses all the data supporting them during their common history. The inventions takes, as input, raw measurements or tracks of both positional and feature information (i.e., kinematic measurements and feature/class measurements) and produces, as output, all-source tracks by associating the measurements/input tracks, and fusing the corresponding kinematic and feature state information (represented as kinematic likelihood scores and feature likelihood scores) in a single operation. Thus, the invention fuses all the available information about targets to be tracked—both kinematic measurements (position, velocity, acceleration, etc.) and feature/class measurements (identification, features, type, class, etc.)—and uses the fused measure (i.e., the joint track likelihood scores) for data association and tracking. The advantage of this unified estimation and decision approach is that it can handle both continuous and discrete uncertainties (as well as incomplete probability models/rules) and use information across modalities for improved accuracy.

In one aspect, the technique uses a joint state that comprises a Gaussian kinematic state and discrete states, which are features extracted from the measurements. The use of feature/class measurements (features) in the data association increases the robustness of the tracker to missing/incomplete/uncertain measurements. Track quality improvement is made through the use of feature likelihood scores (features) in the data association process. The method presented is general-purpose, will work in multiple-target tracking problems with both single and multi-sensor systems, and is not sensor-type dependent. Two qualities of interest of the present invention are: (1) use of a Probabilistic Argumentation System for class/feature fusion to generate feature likelihood scores and (2) an overall system for fusing and combining kinematic information (in the form of kinematic likelihood scores) and class/feature information (in the form of feature likelihood scores). Some advantages of the proposed approach include:

Improved track and identity by fusing data from both kinematic measurements and feature/class measurements;

Improved target identification;

Improved target localization and track continuity;

Rapid reaction against popup threats;

A single, integrated, self-consistent picture; and

Operational payoff.

The present invention provides a feature-aided tracking approach that utilizes class/feature metrics to increase the accuracy and robustness of data association. In order to determine the feature metrics, the system must be modeled and information must be encoded regarding the target class, feature types, relationship between target class, and feature types, etc. The modeling language used in this work is based on "uncertain rules." Using this domain knowledge and incoming feature measurements, evidential reasoning methodology can be used to determine target class information. This information is used in the data association operation. This part of the problem is similar to a target classification problem and is treated as "reasoning under uncertainty" because the knowledge and measurements can be both uncertain and incomplete. An example of a reasoning engine that may be used in conjunction with the present invention is Probabilistic Argumentation System (PAS).

PAS is a powerful technique for solving problems consisting of uncertain, incomplete, or inconsistent information and is based on a novel combination of classical logic (for deduction) and probability theory (for measuring the reliabilities of deductions). Computationally efficient techniques are available for the implementation of PASs. The PAS approach of dealing with partial information is closely connected to the well-known Dempster-Shafer (DS) Theory of Evidence. PAS and DS are both able to accommodate partial knowledge (e.g., partial probability distribution) and imprecise knowledge. They address the real-world limitations of knowledge by generalizing Bayesian probability calculus. If knowledge can be provided at the level of specificity of a probability distribution for each feature type for each target class, as is necessary for Bayesian probability fusion, then the DS, PAS, and Bayesian results are the same. The components in a PAS include a knowledge base (with observations and assumptions/probabilities), qualitative reasoning (arguments for and against an hypothesis of interest), and quantitative reasoning (degree of support, degree of possibility, etc.).

However, PAS has the added advantage that the default knowledge base and measurements are expressed in the form of logical rules and clauses, making it very amenable to most rule-based forms of knowledge. Rule-based knowledge provides for flexible knowledge representation, rules to be presented in predicate logic or multi-valued logic, and for incomplete knowledge (incomplete probability specification—e.g., in a 3 state variable engine type with {E1, E2, E3}, statements such as p(E1, E2)=0.8 are allowed, whereas conventional knowledge would require p(E1)=0.4, p(E2)=0.4, and p(E3)=0.2). The idea behind PAS is that the knowledge about a process or system may be uncertain, incomplete, or even inconsistent. The uncertainty of the knowledge is expressed by assumptions attached to the rules that model this system. Given such a knowledge base, the problem is then to find arguments for hypotheses (queries). Arguments are built from the assumptions appearing in the model and can be calculated through a resolution process similar to those used in predicate logic. Arguments for which the hypothesis is certainly true are called supports (or quasi-supports). Arguments for which the hypothesis is certainly false are called doubts, and arguments for which the hypothesis is possible (or plausible) are called plausibilities. Sets of supports, doubts, etc. can then be computed. Its applicability to identity estimation or fusion in the proposed method is to obtain sets of support for certain target class or disjunction of target classss based on the knowledge and new evidence (measurements).

The linkage between PAS and DS is that the quantities such as support and plausibility of hypotheses obtained from the PAS are the same as the corresponding quantities in a DS system if the rules in the knowledge base are represented in the DS system appropriately. However, the advantages of using PAS rather than DS are that the system modeling process is more flexible and incremental. There is also a potential savings in computation resources without using a full DS model for a specific application.

Figure 3:
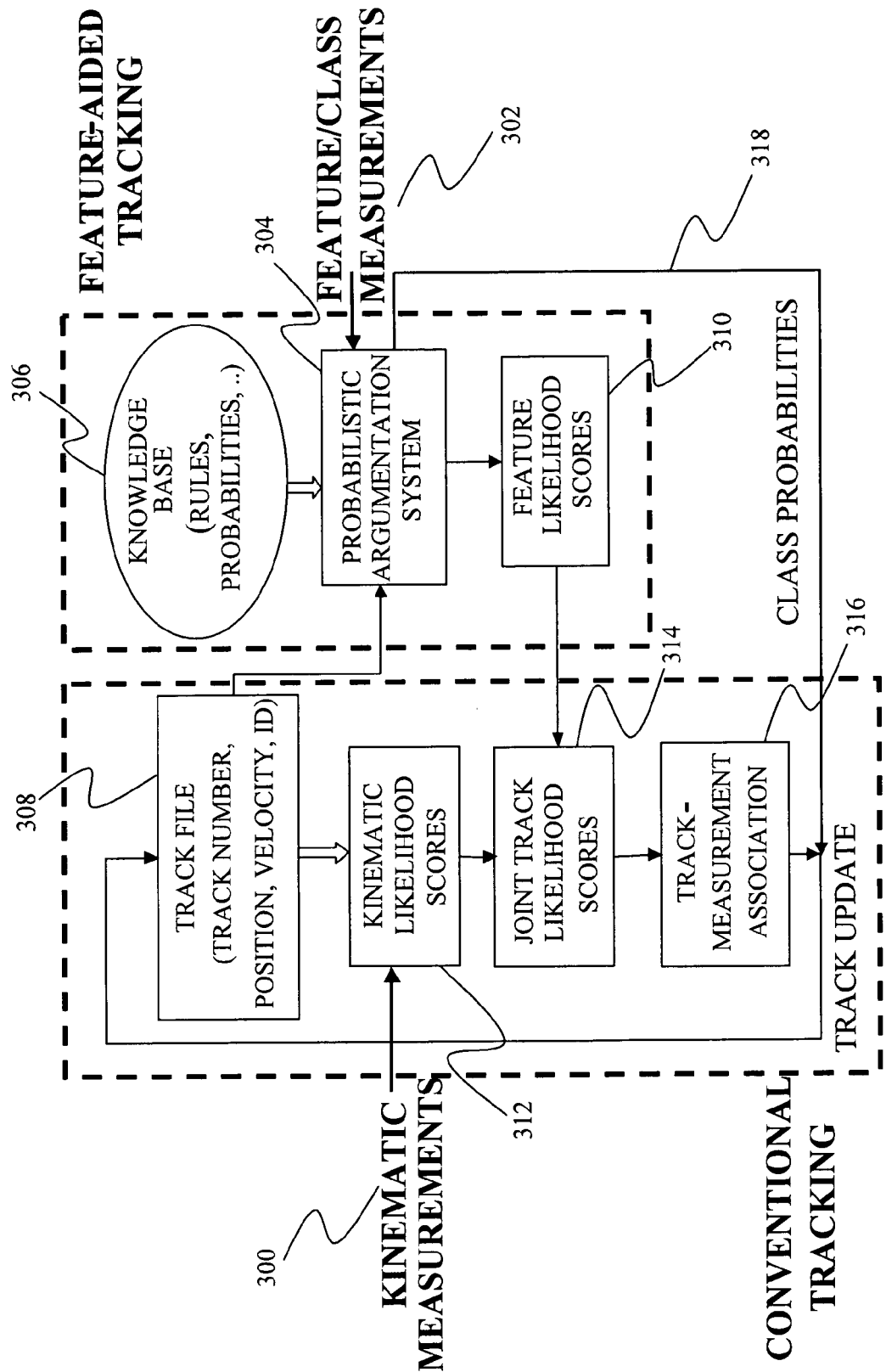
FIG. 3 is a flowchart/block diagram depicting operations and blocks according to the present invention.

A flow diagram generally showing the operations of the present invention is presented in FIG. 3. As shown, kinematic measurements 300 and feature/class measurements 302 are received, typically from a sensor (potentially either the same sensor or from different sensors). Next, a probabilistic argumentation operation is performed by a Probabilistic Argumentation System 304 on the feature/class measurements using information from a knowledge base 306 and a track file 308 to generate feature track likelihood scores 310 that provide information regarding likely tracks for the object. Kinematic track likelihood scores 312 are generated based on the kinematic measurements 300 and the track file 308 regarding the object. The feature track likelihood scores 310 and the kinematic track likelihood scores 312 can be generated simultaneously. The information contained in the knowledge base 306 generally includes items used for probability calculations, e.g., logical rules, probabilities, etc. The information contained in the track file 308 includes items such as a track number associated with a potential object, position information, velocity information, and object/track identity information.

Next, joint track likelihood scores 314 are generated based on the feature likelihood scores 310 and the kinematic track likelihood scores 312. The joint track likelihood scores 314 are then used in a track-measurement association 316 operation to generate a multi-frame track measurement association to determine a most likely track for an object. Thus, each object is associated with a track and the track file 308 is updated using the track-measurement association 316 and class probabilities 318 from the PAS 304, thus allowing an object to be tracked and its track file to be continually updated so that the most likely trajectory and class of the object is obtained. The output of a system of the present invention may comprise the most likely trajectories of all tracked objects, or it may include other information generated in the process just outlined.

In one embodiment, the proposed approach is a tracking system that combines a Kalman filter (Interacting Multiple Model (IMM)) and a Probabilistic Argumentation System (PAS). The Interacting Multiple Model (IMM) estimator is a hybrid filter that is able to estimate the state of a dynamic system with several behavior modes; which makes it natural for tracking maneuvering targets. The functions of the IMM are performed in the block representing the generation of kinematic track likelihood scores 312 and in the block representing the track-measurement association 316. PAS, as previously discussed, is a powerful technique for solving problems consisting of uncertain, incomplete, or inconsistent information, and is based on a combination of classical logic (for deduction) and probability theory (for measuring the reliabilities of deductions). As mentioned, the inputs to the PAS 304 include features or target classss (feature/class measurements 302) and their uncertainties (from the knowledge base 306). The outputs of the PAS 304 include feature likelihood scores 310 that are combined with kinematic track likelihood scores 312 for improved tracking by the Kalman filter, thus generating joint track likelihood scores 314. This association operation is an advantage of the proposed technique, where the likelihood is a joint measure over the continuous and discrete space, and can dramatically increase the accuracy of the association operation and the robustness of the tracker to missing/incomplete/uncertain measurements.

(B) Fusion Details (i) Kinematic Measurement-Based Association

A global nearest neighbor (GNN) approach/technique is desirable for data association. This is often referred to as single-hypothesis tracking or sequential most probable hypothesis tracking. It handles data in a purely sequential manner. For each new measurement, the goal is to identify the most likely assignment of observations to existing tracks and to the new source hypothesis. Observation-to-track assignment scores are computed by using the generalized statistical distance as:

$$KS = d_{ij}^2 + \ln|S_{ij}|, \quad (1)$$

where KS is a kinematic score, $S_{ij}$ is the residual covariance matrix and $d^2_{ij}$ is the normalized statistical distance (defined in terms of residual between prediction for track i and observation j), which are standard Kalman filtering terms.

The above is the cost for those observation-to-track assignments that satisfy a gate. The gate is a fixed, ad-hoc chosen, value with which KS is compared. An arbitrary large cost can be assigned to pairings that do not satisfy the gate. Other methods use a multiple hypothesis tracking log-likelihood (technique) or score function similar to that presented in equation (1). In all of these methods, the basic premise is to use the kinematic measurements in a score and use it for data association (i.e., which measurement belongs to which existing track or a new track).

It is important to note that other methods/techniques can be used for kinematic measurement-based association (e.g., multiple hypothesis tracking, global nearest neighbor, log-likelihood, etc.), with the basic premise of using the kinematic measurements to provide a score for associating the measurement with an existing track or for creating a new track.

(ii) Extension to Feature Data

In order to make use of available feature/class information about the targets in addition to kinematic information, it is necessary to create a measure that incorporates both of these information types. Thus, it is necessary to compute the probability term associated with the potential assignment of a feature to a given track. It is assumed that a class (identity) estimate has been formed from previous measurements assigned to this track. This is an iterative process where it is possible to start with zero knowledge and equal probabilities may be assigned to all possible classes of an object. Then, as feature/class measurements are obtained, the class probabilities for an object may be updated using measurements assigned to that object. Given the present class measurement Z and a set of previous class measurements associated with this track $\hat{Z}$, the probability that this track produced measurement Z is given by:

$$P(Z/\hat{Z}) = \sum_{j=1}^{J} P(Z/T_j) P(T_j/\hat{Z}), \quad (2)$$

assuming the measurements are independent given the target class. Here $T_j$ are the target classes that the measurement Z can take. Often, instead of the track type information being available directly, the feature information (F) about the target class is available. In such a case, it is necessary to know the relation between the feature and the target class as well. The above equation would then be modified to:

$$P(Z/\hat{Z}) = \sum_{j=1}^{J} P(Z/F) P(F/T_j) P(T_j/\hat{Z}), \quad (3)$$

assuming the feature measurement is independent of the target class given the true feature. Incorporating this class or feature probability measure into the normalized distance in equation (1), the following is obtained:

$$d_{G_{ij}}^2 = d_{ij}^2 + \ln|S_{ij}| - 2\ln[P(Z/\hat{Z})], \text{ or} \quad (4)$$

$$TS = KS - FS, \text{ where:} \quad (4a)$$

$$KS = d_{ij}^2 + \ln|S_{ij}| \text{ and} \quad (4b)$$

$$FS = 2\ln[P(Z/\hat{Z})]. \quad (4c)$$

(iii) PAS for the Feature Likelihood Term

Above, a technique to include class/feature data in the data association operation using a Bayesian formulation was presented. One limitation of Bayesian methods is that the conditional probabilities need to be known for feature measurements. Often such probability descriptions are not available, or are incomplete. Probabilistic Argumentation Systems (PAS) and evidential reasoning methods are both ideal in this situation since they do not require complete probabilistic information. Furthermore, they have a distinct advantage here in that a quantity called the degree of contradiction (k) can be used in lieu of the probabilistic measure (for normalization). Useful information regarding PAS will now be presented.

PAS is a tool for reasoning under uncertainty. In PAS, the knowledge base is rules or logic clauses that are either single logic variables (propositions) or statements derived from standard logic operations on a set of propositions. The uncertainty of a rule is expressed by attaching assumptions with it. The assumptions are a set of logic variables themselves and have an assigned probability value. The uncertainty of an uncertain logic clause (rule) is quantified by the probability of the assumptions that appear in its body.

First, the set of assumptions be $A = \{\alpha_1, \ldots, \alpha_n\}$ is defined, where elements $\alpha_i$ are assumptions. $Pr(\alpha_i)$ denotes the probability of assumption $\alpha_i$.

PAS operates by combining classical logic and probability theory. Given a rule-based knowledge base, the problem is to find arguments for hypotheses (queries). A hypothesis is a logic sentence that represents some of the open questions or statements about the uncertain knowledge base. An example hypothesis would be "Target 1 is of class T2." PAS utilizes a logic resolution process to derive arguments that support and refute the hypotheses. These arguments are built from the assumptions appearing in the knowledge base. In order to quantify a hypothesis, the system combines probabilities of the arguments themselves based on the assumptions that appear in the derived arguments.

If the hypotheses is denoted by H, then the following terms are most commonly encountered in PAS:

qs(H)=quasi-support of H;

dqs(H)=degree of quasi-support of H;

dsp(H)=degree of support of H; and
⊥=contradiction.

In general, the quasi-support qs(H) of a hypothesis H is a disjunctive normal formula (DNF) of the form:

$$qs(H) = \alpha_1 \vee \ldots \vee \alpha_l,$$

where $\alpha_i \subseteq A, i=1, \ldots, l$, are conjunctions of assumptions and each $\alpha_i$ is called an argument supporting H. The degree of quasi-support dqs(H) is then the probability of qs(H), and can be computed from the probabilities of arguments which, in turn, depend on the probability of the assumptions that appear in them. However, since the arguments $\alpha_i$ are disjoint, the calculation of the dqs(H) is straightforward. The degree of quasi-support dqs(H) is then simply:

$$dqs(H) = \sum_i \text{Probability}(\alpha_i) = \sum_i \left( \prod_{a \in \alpha_i} \text{Probability}(a) \right)$$

Contradiction is a special hypothesis and is the conflict between the knowledge base/current system state and the feature/class measurements. The degree of quasi-support of the contradiction dqs(⊥) is also simply called the degree of contradiction and is denoted by k. It is calculated by using the above equation. The quantity (1−k) can then be viewed as a measure of the correctness of the association of the measured feature/class data with the current state.

The degree of support dsp(H) is given by:

$$dsp(H) = \frac{dqs(H) - dqs(\perp)}{1 - dqs(\perp)}.$$

Once the correct data association has been computed, dsp(H) can be used to update the track class probabilities in the knowledge base 306.

As stated above, the degree of contradiction k in a PAS system is a measure of conflict or contradiction between the current knowledge state and the measured features. The quantity 1−k is similar to $P(Z|\hat{Z})$ for the Bayesian approach and is a measure of the correctness of a given association. Substituting this in equation (4) gives:

$$d_{G_{ij}}^2 = d_{ij}^2 + \ln|S_{ij}| - 2\ln[1-k]. \quad (5)$$

(iv) Track Pairing

The above normalized distance is a score based on both kinematic and class/feature measurements. Note that this score is computed for all candidate track-measurement pairings. In order to reduce feature processing, standard gating is used. Only observation-to-track associations that satisfy this gate are sent to the PAS for computing the degree of contradiction (k). The combined score forms the elements of a 2-D assignment matrix (a matrix having tracks along rows and measurements along columns). The assignment matrix problem may, as a non-limiting example, be solved using the well-known Munkres algorithm. Several other approaches could be used. The output from the assignment operation is a track-measurement pairing. This information is then used to update the track file 308. Track kinematic parameters (for the track file 308) are updated using the standard IMM update equations. Track identification (ID) estimates are updated using the PAS 304.

(C) Simulation (i) In General

This section is intended to present the reader with a non-limiting example of an application of the present invention. The material presented here is intended to provide the reader with further context to assist in understanding the function of the present invention, and is not intended to provide any limitation in this regard.

Figure 4A:
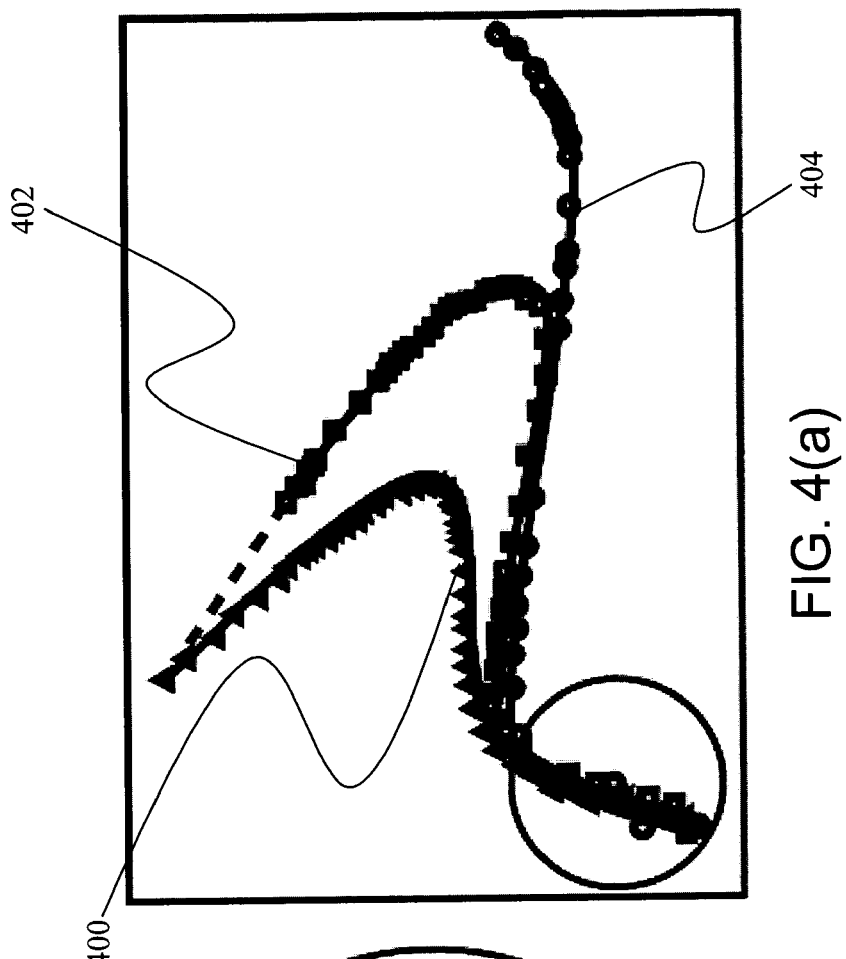
FIG. 4(a) is an illustration of the three tracks and FIG. 4(b) is a zoomed-in illustration of a portion of the three tracks that are shown in FIG. 4(a)
Figure 4B:
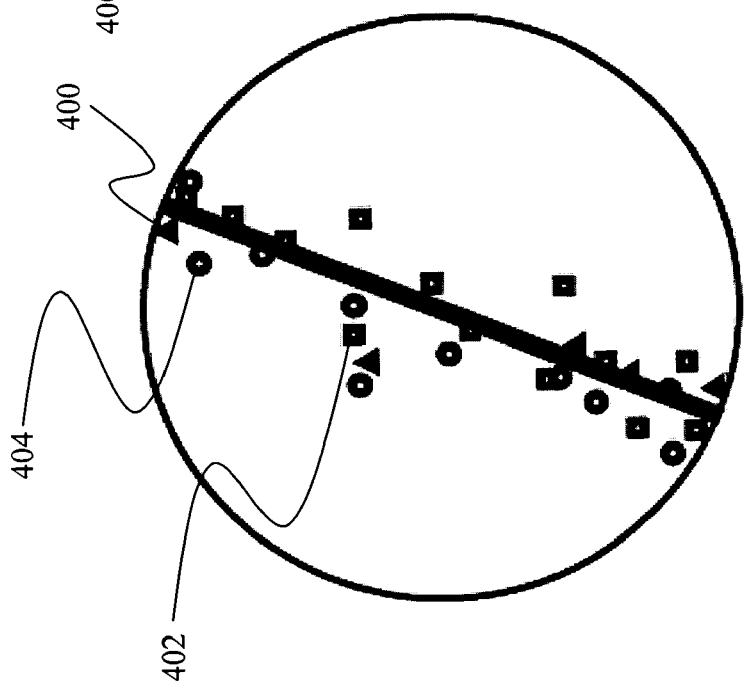

The techniques presented herein are now evaluated in the case of tracking three maneuvering aircraft in an air show, as shown in FIGS. 4(a) and 4(b). A two-dimensional view of actual target trajectories, a first trajectory 400, a second trajectory 402, and a third trajectory 404, are presented. Note that the actual trajectories appear as solid lines because of the density of samples and the size of the representative shapes for the samples. As presented in FIG. 4(a), the targets are participating in an air show, flying in close proximity at times, and maneuvering toward or away from each other at other times. A zoomed portion of FIG. 4(a) is presented in FIG. 4(b), depicting the beginning of the flights when the targets are flying very close to each other. It is assumed, for purposes of the example, that an adaptive radar sensor provides data samples every 3 seconds during non-maneuvering times, and every 0.3 seconds during maneuvering times. In actual implementation, a situation awareness module that uses the IMM mode probabilities as its inputs to determine the target mode is used to control the radar sampling rate. The squares (corresponding to the first trajectory 400), the triangles (corresponding to the second trajectory 402), and the circles (corresponding to the third trajectory 404) shown in the figure represent position measurements made by the radar sensor. Note that the radar only makes the measurements—it has no information regarding which measurement is from which track or target. The separation of the measurements into squares, triangles, and circles is a product of the operation of the present invention. Because of the proximity of the targets, they are sometimes not resolvable by the radar resulting in number of measurements that are fewer than the number of actual targets. In addition, the measurement errors are sometimes larger than the separation between the targets (clearly seen in the zoomed view).

It is assumed that each aircraft is of a different class (ID) and that the domain of target classes or classes is thus {T1, T2, T3}. It is also assumed that there exists a discrete feature F of domain {F1, F2, F3}. It is further assumed that the following domain knowledge (incomplete probability specification) about the target-feature relationship is available in the form of rules relating the target class with the declared feature type(s).

| RULE R1 | T1 => F1; | 60% |
| RULE R2 | T1 => F2 or F3; | 40% |
| RULE R3 | T2 => F1; | 10% |
| RULE R4 | T2 => F2; | 60% |
| RULE R5 | T2 => F3; | 30% |
| RULE R6 | T3 => F3; | 99% |

Thus, for example, Rule R1 states that there is a 60% probability of declaring feature F1 if the target is of type T1. Similarly Rule R2 states that there is a 40% probability of declaring features F2 or F3 from target class T1. This is a typical way to represent ignorance or uncertainty in a Probabilistic Argumentation System. Note that in a Bayesian framework, probabilities would have to be assigned only to singletons, and any leftover probabilities would have to be assigned to leftover singletons and sum to unity. In the above knowledge base, there are no such restrictions. In PAS, these rules would be appended with assumptions with the given probabilities.

It is assumed that at the beginning, complete ignorance exists, i.e., there is no knowledge about the target class for each of the tracks. The IMM filtering approach uses three Kalman filters that run in parallel. The implementation presented herein for aircraft uses a non-maneuver filter model and two maneuver filter models. The standard state vector (position, velocity) representation has been augmented to include target identification estimates. For each simulation operation, the kinematic measurements 300 are used to compute the kinematic association score (the kinematic track likelihood score 312). The feature measurements (feature/class measurements 302) are added as new rules in the knowledge base 306 and fused using the PAS 304 to obtain the updated target class probabilities and the feature track likelihood scores 310. The data association is carried out, as described previously, by generating joint track likelihood scores 314 and performing track measurement association 316. Based on the data association (track measurement association 316), the track state vectors of the track file 308 are updated.

The following performance metrics were used to compare the tracker performance with and without feature data to provide for comparison. These metrics are based on the entire time history of target tracking. Most of the improvement due to use of features in the data association is during the time period when aircraft (tracks) were flying in very close proximity (measurement error larger than track separation). During other times, data association based on kinematic information alone is accurate and the use of features does not provide much added value. The metrics are as follows.

Track mis-associations occur when a measurement is paired with a wrong track and is defined as:

$$\text{Track misassociation} = 100 \times \frac{\text{\# wrong associations}}{\text{\# total associations}} \%. \quad (6)$$

Track Root-Mean-Square (RMS) position error is the root mean square kinematic position error between the ground truth (actual trajectory) and estimated track position and is defined as:

$$\text{RMS error} = \frac{1}{N}\sqrt{\sum_{i=1}^{N}\left(\begin{array}{l}(x_i^{true}-x_i^{estimated})^2 + \\ (y_i^{true}-y_i^{estimated})^2 + \\ (z_i^{true}-z_i^{estimated})^2\end{array}\right)}. \quad (7)$$

Here N is the total number of time samples, "true" and "estimated" indicate values and estimates for determining the degree of error, i is an index variable, and (x,y,z) are the Cartesian position coordinates.

Track identification (ID) accuracy is the accuracy in declaring a correct target class of a track based on the PAS output. When data association is not correct, the feature measurements will be associated with the wrong track and the ID estimation done accordingly will result in erroneous ID declaration. A track is declared to be a certain target class when the degree of support exceeds a certain decision threshold. For this simple case, and for ease of explanation, this threshold was chosen to be 0.8. Note that the choice of 0.8 is somewhat arbitrary and that it is not intended to be construed as limiting the invention in any way.

Non-declared track ID: If the degree of support of any target class for a track is below this threshold, the ID (target class) is not declared for this track. The number of such non-declared track ID cases is used as a measure of track ID accuracy.

False track ID: When the declared ID of a track is different than the actual ID (available from ground truth), then it is used as a measure of false track ID.

(ii) Data Association with Kinematic Measurements Only

A table presented in FIG. 5, in the column labeled "without features," displays the results based on use of only kinematic measurements 300 from the radar. Using equation (1) for data association gives frequent mis-associations (23% incorrect track-measurement pairing). This results in poor track quality in terms of kinematic accuracy as indicated by the large RMS position error. If the data association results are used to update the track ID in the PAS module, results include very poor ID estimation accuracy with 14% non-declared ID and 4% false track ID.

(iii) Data Association with Kinematic and Feature/Class Measurements

The table presented in FIG. 5, in the column labeled "with features," presents the results based on use of both kinematic measurements 300 and feature/class measurements 302. Using equation (5) for data association results in excellent data association (only 2% incorrect track-measurement pairing (track misassociations)). The feature track likelihood score 310 is fed to the joint likelihood computation module to compute the joint track likelihood score 314. The resultant scores form the 2-D assignment matrix. Once the associations (the track measurement associations 316) are computed, the tracks are updated accordingly. As a consequence of correct associations, both the track quality and track ID estimates are very accurate. No false track ID was declared in this case.

The above example shows how feature data can be used to improve data association thus improving target ID estimation as well as data association accuracy.

(3) Conclusion

The present invention presents an object that uses feature data to improve data association, thus improving both target kinematic state and ID estimation, improving the quality of the data stored in the track file 308. The tracker provides robust and accurate data association for difficult environments, such as dense environments, as well as in the presence of clutter, complex track movements, etc. Other more advanced methods may be incorporated with the present invention, such as, but not limited to, MHT, etc., to further improve ID estimation over that derived from a simple global nearest-neighbor data association tracker.

This above example demonstrated how feature data is used by the present invention to improve data association thus improving target ID estimation. Other embodiments include but are not limited to MFA, MHT, etc. and will further improve ID estimation over that derived from a SFA tracker. This hybrid method can be applied in the context of multi-frame data association (MFA). MFA delays making a decision on a crisp association until sufficient evidence has been accumulated to make a confident decision.

What is claimed is:

1. A method for joint kinematic and feature tracking comprising acts of:

receiving kinematic measurements and feature/class measurements regarding an object from at least one sensor;

performing a probabilistic argumentation operation on the feature/class measurements using information from a rule-based knowledge base and a track file regarding the object to generate feature track likelihood scores that provide information regarding likely tracks for the object;

generating kinematic track likelihood scores based on the kinematic measurements and the track file regarding the object;

generating joint track likelihood scores based on the feature track likelihood scores and the kinematic track likelihood scores;

using the joint track likelihood scores to generate a multi-frame track measurement association to determine a most likely track for the object; and updating the track file with the most likely track for the object; whereby the method tracks an object and continually updates the track file for the object, so that the most likely trajectory of the object is obtained.

2. A method as set forth in claim 1, wherein the kinematic track likelihood scores are generated using a technique selected from a group consisting of a global nearest neighbor technique, multiple hypothesis tracking technique, and a log-likelihood technique.

3. A method as set forth in claim 2, further comprising an act of normalizing the feature track likelihood scores and the kinematic track likelihood scores to compute the joint track likelihood scores.

4. A method as set forth in claim 3, wherein the act of normalizing uses a degree of contradiction, k, in a Probabilistic Argumentation System used to perform the probabilistic argumentation operation as a part of an act of performing a normalizing calculation.

5. A method as set forth in claim 4, wherein the kinematic measurements are received radar signals.

6. A method as set forth in claim 5, wherein the feature/class measurements are received radar signals.

7. A method as set forth in claim 6, wherein in the act of performing a probabilistic argumentation operation, class probabilities are generated for the feature/class measurements and are used, along with the kinematic track likelihood scores in the determination of a most likely track for an object.

8. A method as set forth in claim 7, wherein the acts of generating kinematic track likelihood scores and generating joint track likelihood scores are performed substantially simultaneously, whereby kinematic and class information regarding a target may be simultaneously updated.

9. A method as set forth in claim 8, further comprising an act of outputting a representation of the most likely trajectory of an object for a user.

10. A method as set forth in claim 1, further comprising an act of normalizing the feature track likelihood scores and the kinematic track likelihood scores to allow for accurate computation of the joint track likelihood scores.

11. A method as set forth in claim 10, wherein the act of normalizing uses a degree of contradiction, k, in a Probabilistic Argumentation System used to perform the probabilistic argumentation operation as a part of an act of performing a normalizing calculation.

12. A method as set forth in claim 1, wherein the kinematic measurements are received radar signals.

13. A method as set forth in claim 1, wherein the feature/class measurements are received radar signals.

14. A method as set forth in claim 1, wherein in the act of performing a probabilistic argumentation operation, class probabilities are generated for the feature/class measurements and are used, along with the kinematic track likelihood scores in the determination of a most likely track for an object.

15. A method as set forth in claim 1, wherein the acts of generating kinematic track likelihood scores and generating joint track likelihood scores are performed substantially simultaneously, whereby kinematic and class information regarding a target may be simultaneously updated.

16. A method as set forth in claim 1, further comprising an act of outputting a representation of the most likely trajectory of an object for a user.

17. A computer program product for joint kinematic and feature tracking comprising a computer-readable medium having computer-executable instructions encoded therein for causing a computer to perform operations of:

receiving kinematic measurements and feature/class measurements regarding an object from at least one sensor;

performing a probabilistic argumentation operation on the feature/class measurements using information from a rule-based knowledge base and a track file regarding the object to generate feature track likelihood scores that provide information regarding likely tracks for the object;

generating kinematic track likelihood scores based on the kinematic measurements and the track file regarding the object;

generating joint track likelihood scores based on the feature track likelihood scores and the kinematic track likelihood scores;

using the joint track likelihood scores to generate a multi-frame track measurement association to determine a most likely track for the object; and updating the track file with the most likely track for the object; whereby the computer program product tracks an object and continually updates the track file for the object, so that the most likely trajectory of the object is obtained.

18. A computer program product as set forth in claim 17, wherein the kinematic track likelihood scores are generated using a technique selected from a group consisting of a global nearest neighbor technique, multiple hypothesis tracking technique, and a log-likelihood technique.

19. A computer program product as set forth in claim 18, further comprising computer-executable instructions for normalizing the feature track likelihood scores and the kinematic track likelihood scores to compute the joint track likelihood scores.

20. A computer program product as set forth in claim 19, wherein the computer-executable instructions provide that the act of normalizing uses a degree of contradiction, k, in a Probabilistic Argumentation System used to perform the probabilistic argumentation operation as a part of an act of performing a normalizing calculation.

21. A computer program product as set forth in claim 20, wherein the kinematic measurements are received radar signals.

22. A computer program product as set forth in claim 21, wherein the feature/class measurements are received radar signals.

23. A computer program product as set forth in claim 22, wherein the computer-executable instructions provide that in the operation of performing a probabilistic argumentation operation, class probabilities are generated for the feature/ class measurements and are used, along with the kinematic track likelihood scores in the determination of a most likely track for an object.

24. A computer program product as set forth in claim 23, wherein the computer-executable instructions provide that the operations of generating kinematic track likelihood scores and generating joint track likelihood scores are performed substantially simultaneously, whereby kinematic and class information regarding a target may be simultaneously updated.

25. A computer program product as set forth in claim 24, further comprising computer-executable instructions for performing an operation of outputting a representation of the most likely trajectory of an object for a user.

26. A computer program product as set forth in claim 17, further comprising computer-executable instructions for normalizing the feature track likelihood scores and the kinematic track likelihood scores to allow for accurate computation of the joint track likelihood scores.

27. A computer program product as set forth in claim 26, wherein the computer-executable instructions provide that the act of normalizing uses a degree of contradiction, k, in a Probabilistic Argumentation System used to perform the probabilistic argumentation operation as a part of an act of performing a normalizing calculation.

28. A computer program product as set forth in claim 17, wherein the kinematic measurements are received radar signals.

29. A computer program product as set forth in claim 17, wherein the feature/class measurements are received radar signals.

30. A computer program product as set forth in claim 17, wherein the computer-executable instructions provide that in the operation of performing a probabilistic argumentation operation, class probabilities are generated for the feature/class measurements and are used, along with the kinematic track likelihood scores in the determination of a most likely track for an object.

31. A computer program product as set forth in claim 17, wherein the computer-executable instructions provide that the operations of generating kinematic track likelihood scores and generating joint track likelihood scores are performed substantially simultaneously, whereby kinematic and class information regarding a target may be simultaneously updated.

32. A computer program product as set forth in claim 17, further comprising computer-executable instructions for performing an operation of outputting a representation of the most likely trajectory of an object for a user.

33. An apparatus for joint kinematic and feature tracking, the apparatus comprising a computer system, the computer system including:
   an input for receiving kinematic measurements and feature/class measurements regarding an object from at least one sensor;
   a probabilistic argumentation module for performing a probabilistic argumentation operation on the feature/class measurements using information from a rule-based knowledge base and a track file regarding the object to generate feature track likelihood scores that provide information regarding likely tracks for the object;
   a kinematic track likelihood score generator for generating kinematic track likelihood scores based on the kinematic measurements and the track file regarding the object;
   a joint track likelihood score generator for generating joint track likelihood scores based on the feature track likelihood scores and the kinematic track likelihood scores;
   a track measurement association generator for using the joint track likelihood scores to generate a multi-frame track measurement association to determine a most likely track for the object; and
   a track file updating module for updating the track file with the most likely track for the object; whereby the method tracks an object and continually updates the track file for the object, so that the most likely trajectory of the object is obtained.

34. An apparatus as set forth in claim 33, wherein the kinematic track likelihood scores are generated using a technique selected from a group consisting of a global nearest neighbor technique, multiple hypothesis tracking technique, and a log-likelihood technique.

35. An apparatus as set forth in claim 34, further comprising a normalizing module for normalizing the feature track likelihood scores and the kinematic track likelihood scores to compute the joint track likelihood scores.

36. An apparatus as set forth in claim 35, wherein the normalizing module uses a degree of contradiction, k, in a Probabilistic Argumentation System used to perform the probabilistic argumentation operation as a part of an act of performing a normalizing calculation.

37. An apparatus as set forth in claim 36, wherein the kinematic measurements are received radar signals.

38. An apparatus as set forth in claim 37, wherein the feature/class measurements are received radar signals.

39. An apparatus as set forth in claim 38, wherein in the probabilistic argumentation module, class probabilities are generated for the feature/class measurements and are used, along with the kinematic track likelihood scores in the determination of a most likely track for an object.

40. An apparatus as set forth in claim 39, wherein the kinematic track likelihood score generator and joint track likelihood score generator operate substantially simultaneously, whereby kinematic and class information regarding a target may be simultaneously updated.

41. An apparatus as set forth in claim 40, further comprising an output for outputting a representation of the most likely trajectory of an object for a user.

42. An apparatus as set forth in claim 33, further comprising a normalizing module for normalizing the feature track likelihood scores and the kinematic track likelihood scores to compute the joint track likelihood scores.

43. An apparatus as set forth in claim 42, wherein the normalizing module uses a degree of contradiction, k, in a Probabilistic Argumentation System used to perform the probabilistic argumentation operation as a part of an act of performing a normalizing calculation.

44. An apparatus as set forth in claim 33, wherein the kinematic measurements are received radar signals.

45. An apparatus as set forth in claim 33, wherein the feature/class measurements are received radar signals.

46. An apparatus as set forth in claim 33, wherein in the probabilistic argumentation module, class probabilities are generated for the feature/class measurements and are used, along with the kinematic track likelihood scores in the determination of a most likely track for an object.

47. An apparatus as set forth in claim 33, wherein the kinematic track likelihood score generator and joint track likelihood score generator operate substantially simultaneously, whereby kinematic and class information regarding a target may be simultaneously updated.

48. An apparatus as set forth in claim 33, further comprising an output for outputting a representation of the most likely trajectory of an object for a user.

* * * * *